United States Patent Office 3,832,359
Patented Aug. 27, 1974

3,832,359
PRODUCTION OF MALEIC ANHYDRIDE BY
CATALYTIC OXIDATION OF SATURATED
ALIPHATIC HYDROCARBONS
Marshall C. Freerks and Michael Suda, St. Louis, Mo., assignors to Monsanto Company, St. Louis, Mo.
No Drawing. Filed Oct. 6, 1971, Ser. No. 187,114
Int. Cl. C07d 5/04
U.S. Cl. 260—346.8
6 Claims

ABSTRACT OF THE DISCLOSURE

Maleic anhydride is produced by the catalytic vapor phase oxidation of a saturated aliphatic hydrocarbon, e.g., n-butane, in the presence of a catalyst comprising phosphorus, vanadium, iron and oxygen.

---

This invention relates to a method for the preparation of maleic anhydride by the catalytic vapor phase oxidation of saturated aliphatic hydrocarbons.

Production of maleic anhydride by the catalytic vapor phase oxidation of benzene and butene is well known. The principal method currently employed for manufacturing maleic anhydride is by the vapor phase oxidation of benzene in the presence of certain heavy metal axide catalysts.

Comparatively little attention, however, has been given to the use of saturated aliphatic hydrocarbons, e.g., butane, as feedstocks for the preparation of maleic anhydride. This is due in part to the fact that butane is more difficult to oxidize than benzene or butene, often resulting in low conversions to maleic anhydride and an uneconomical process. Although catalysts for the oxidation of saturated aliphatic hydrocarbons are known, the yields of the desired maleic anhydride product over the known catalysts are, in most cases, insufficiently high to make such feedstocks competitive with benzene. Efficient conversion of the saturated aliphatic hydrocarbon to maleic anhydride, together with longer catalyst life, is desirable.

Accordingly, it is an object of the present invention to provide a process for obtaining improved yields of maleic anhydride together with substantial improvements in selectivity.

A further object of the present invention is to provide a process for the catalytic vapor phase oxidation of saturated aliphatic hydrocarbons to maleic anhydride in improved yields and improved selectivities.

Still a further object of the present invention is to provide an improved type of catalyst for carrying out the vapor phase oxidation of saturated aliphatic hydrocarbons to maleic anhydride.

These and other objects are accomplished according to the present invention by contacting the vapor of a saturated aliphatic hydrocarbon having from 4 to 10 carbon atoms, with a catalyst comprising phosphorus, vanadium, iron and oxygen. When the phosphorus, vanadium and iron are present in well defined proportions, unexpectedly high yields of maleic anhydride are achieved from saturated aliphatic hydrocarbon feedstocks. Optimum results are obtained when the atomic ratio of phosphorus to vanadium in the catalyst is between about 2:1 and about 8:1 with the atomic ratio of iron to vanadium between about 1:1 and about 4:1. Thus, it is preferred to employ catalysts within the aforementioned composition range. An outstanding catalyst composition within the scope of the present invention contained 11.13 atomic percent vanadium, 64.56 atomic percent phosphorus and 24.31 atomic percent iron, representing a phosphorus to vanadium atomic ratio of 5.8:1 and an iron to vanadium atomic ratio of 2.18:1. By "atomic percent" herein is meant the fractional part (expressed as a percentage of the atomic sum) of the metals present in the active component of the catalyst.

Superior results can still be realized, however, when the atomic ratio of phosphorus to vanadium is maintained between about 1:1 and about 20:1, while the atomic ratio of iron to vanadium is between about 0.2:1 and about 10:1.

The catalysts taught by the present invention can be prepared in a variety of ways readily apparent to those skilled in the catalyst art. However, it is preferred to prepare them from an aqueous slurry or solution of phosphorus, vanadium and iron compounds and subsequently heat this aqueous mixture to drive off substantially all of the water and also any other volatile products that may be present. The catalyst composition can thereupon be deposited onto a support or carrier although it has been found that an unsupported catalyst (without carrier) made, for example, by extruding the catalyst material, usually affords higher yields in the process of the present invention. The catalyst may also be prepared by precipitating the vanadium, phosphorus and iron compounds, either with or without a carrier, from a colloidal dispersion of the ingredients in an inert liquid. However, care must be taken not to vaporize off any of the ingredients such as phosphorus. The catalyst may also be prepared by heating and mixing anhydrous forms of phosphoric acid with the vanadium compounds and the iron compounds. The catalysts may be used as either fluid bed or fixed bed catalysts. In any of the methods of preparation, heat may be applied to accelerate the formation of the catalyst complex. Although some methods of catalyst preparation are preferred, any method may be used which results in the formation of the catalyst complex containing the specified ratios of vanadium, phosphorus and iron.

Suitable phosphorus compounds that may be employed in the preparation of catalysts herein include mono-, di- and tri-ammonium phosphates, metaphosphoric acid, triphosphoric acid, pyrophosphoric acid, orthophosphoric acid, phosphorus pentoxide, phosphorus oxyiodide, ethyl phosphate, methyl phosphate, amine phosphate, phosphorus pentachloride, phosphorus trichloride, phosphorus oxybromide, iron phosphates and the like.

Suitable vanadium compounds useful as starting materials are compounds such as vanadium pentoxide, ammonium metavanadate, vanadium trioxide, vanadyl chloride, vanadyl dichloride, vanadyl trichloride, vanadium sulfate, vanadium phosphate, vanadium tribromide, vanadyl formate, vanadyl oxalate, metavanadic acid, pyrovanadic acid, vanadyl sulfate and the like.

Various iron compounds, both ferric and ferrous, such as ferrous sulfide, ferric and ferrous halides, ferric and ferrous sulfate, ferrous oxalates, ferrous citrate, ferrous phosphates, and the like can be used as the source of iron.

Thus, any vanadium, phosphorus and iron compounds may be used as starting materials which, when the compounds are combined and heated to dryness in air at a temperature of, for example, 110° C., followed by calcining at 500° C., will leave as a deposit a catalyst complex having relative proportions within the described ranges. Calcining is most conveniently accomplished by exposing the catalyst composition to a stream of air at a temperature between about 400° C. and 600° C., but may also be accomplished with an inert gas or oxygen.

Although the catalysts useful in the present invention poduce superior results when separately formed and used as pellets without a supporting carrier, it is sometimes desirable to deposit the catalyst material onto a carrier. The carrier may be added to the catalyst complex containing phosphorus, vanadium, iron and oxygen or the catalyst solution may be poured onto the carrier. Also, the carrier may be present during the entire course of reactions to provide the desired phosphorus-vanadium-iron-oxygen complex.

The support or carrier for the phosphorus-vanadium-iron-oxygen complex, if any, should preferably be inert to the depositing solution containing the complex and should be inert under the catalytic oxidation conditions. The carrier provides not only the required surface for the catalyst, but gives physical strength and stability to the catalyst material. The carrier or support preferably has a low surface area, as usually measured, from about 0.001 to about 5 square meters per gram. A desirable form of carrier is one which has a dense, non-absorbing center and a rough enough surface to aid in retaining the catalyst adhered thereto during handling and under reaction conditions. The carrier may vary in size but generally is from about 2½ mesh to about 10 mesh in the Tyler Standard screen size. Alundum particles as large as ¼ inch are satisfactory. Carriers much smaller than 10 to 12 mesh normally cause an undesirable pressure drop in the reactor, unless the catalysts are being used in a fluid bed apparatus. Any of the conventional inert carriers may be used in this capacity, including silica gel, silica alumina, silica, carborundum, kieselguhr, boron phosphate, alundum, fuller's earth, pumice, silicon carbide and asbestos.

The amount of catalyst complex (active catalytic component) deposited on the carrier should be sufficient to substantially coat the surface of the carrier. For a fixed bed reactor installation, the final size of the catalyst coated on a carrier will preferably be from about 2½ to about 10 mesh size. The size of the catalyst pellets used in fluidized bed reactors is quite small, however, usually varying from about 10 to about 150 microns, and in such systems the catalyst normally will not be provided with a carrier but will be formed into the desired particle size after drying from solution. The carriers may be of a variety of shapes, the preferred shape being cylindrical or spherical.

Inert diluents such as silica may be present in the active portion of the catalyst, but the combined weight of the essential active ingredients of phosphorus, vanadium, iron and oxygen should preferably consist essentially of at least about 50 weight percent of the composition which is coated on the carrier, if any, and preferably these components are at least about 75 weight percent of the composition coated on the carrier, and more preferably at least about 95 weight percent. If desired, any remainder other than the atoms of phosphorus, vanadium, iron and oxygen may be essentially inert nno-catalytic ingredients intimately combined with the phosphorus, vanadium, iron and oxygen as a part of the coating on the carrier.

In accordance with the present invention, various saturated aliphatic hydrocarbons having from 4 to 10 carbon atoms are oxidized over the phosphorus-vanadium-iron-oxygen catalyst to produce maleic anhydride. Since n-butane is readily available in good purity at a relatively low price, as compared to other saturated aliphatic hydrocarbons of the indicated class, it is preferred to employ n-butane in the practice of the present invention. Accordingly, principal reference is made in the present specification to the preparation of maleic anhydride by the catalytic oxidation of n-butane. It will be understood, however, that the oxidation of other saturated aliphatic hydrocarbons having from 4 to 10 carbon atoms is within the scope of the present invention.

The process of the present invention is most conveniently carried out by passing a stream of oxygen or oxygen-containing gas (e.g., air), containing the saturated aliphatic hydrocarbon to be oxidized, over a bed of the catalyst contained in any conventional fixed bed converter tube. The oxidation reaction takes place at temperatures of from about 400° to 600° C., preferably from about 450° to 550° C., under pressures ranging from about 0.5 to 10 atmospheres, desirably about 1 to 5 atmospheres. In the case of n-butane, optimum yields of maleic anhydride are achieved when the n-butane is admixed with air in the proportion of from about 0.5 to 10 mole percent, preferably from about 1 to 4 mole percent, of the total oxidation mixture, and passed over the catalyst while maintaining a space velocity between about 200 and 7000 reciprocal hours, preferably, in the case of fixed bed reactors, from about 1000 to 3000 reciprocal hours. Space velocity is defined herein as the volume of gaseous mixture at 15.5° C. and 760 mm. of mercury pressure per volume of empty converter tube in the catalyst zone per hour.

A variety of reactors will be found to be useful and multiple tube heat exchanger type reactors are quite satisfactory. The tubes of such reactors may vary in diameter from about ¼ inch to about 3 inches, and the length may be varied from about 3 to about 10 or more feet. Since the oxidation of n-butane or other saturated aliphatic hydrocarbons within the scope of the present invention is an exothermic reaction, it is often necessary to remove the heat of reaction in order to maintain the reaction temperature within the preferred range of from about 450° to 550° C. It is thus desirable to have the surface of the reactors at a relatively constant temperature and some medium to conduct heat from the reactors is usually necessary to aid temperature control. Such media may be mercury, molten lead, and the like, but it has been found that eutectic salt baths are completely satisfactory. One such salt bath is a sodium nitrate-sodium nitrite-potassium nitrate eutectic constant temperature mixture. An additional method of temperature control is to use a metal block reactor whereby the metal surrounding the tube acts as a temperature regulating body. The heat exchange medium may be kept at the proper temperature by heat exchangers and the like. The reactor or reaction tubes may be fabricated of iron, stainless steel, carbon-steel, glass tubes, and the like. Normally, the reactors contain a preheat zone of an inert material such as ¼ inch alundum pellets, inert ceramic balls, nickel balls or chips, and the like.

The catalytic oxidation reaction may be conducted at atmospheric, superatmospheric or subatmospheric pressure, although superatmospheric pressures are generally employed.

Maleic anhydride produced acording to the present invention may be recovered in a number of ways well known to those skilled in the art. For example, the recovery may be by direct condensation or by adsorption in suitable media, with subsequent separation and purification of the maleic anhydride.

Other saturated aliphatic hydrocarbon feedstocks within the scope of the present invention, in addition to butane, are the pentanes, hexanes, heptanes, octanes, nonanes and decanes or mixtures of any of these with or without butane. The aforementioned feedstocks are not necessarily pure substances but may be technical hydrocarbon fractions containing small amounts, for example, 0.1 to 10 percent by weight of olefinically unsaturated hydrocarbons containing more than 4, for example 5 or 6, carbon atoms, or other hydrocarbon fractions.

The present invention will be more readily understood by reference to the following detailed description of preferred embodiments thereof. In each of the examples set forth below, percentage yields are expressed on the basis of the number of pounds of maleic anhydride produced per pound of n-butane fed to the reactor. Also included is the percentage selectivity for each example which is expressed on the basis of the number of pounds of maleic anhydride produced per pound of butane reacted.

Example 1

The following example illustrates the preparation of maleic anhydride by the air-oxidation of n-butane using a catalyst wherein the catalytic component comprises phosphorus, vanadium, iron and oxygen.

The catalyst was prepared as follows:

22.26 grams of ferric nitrate were added to 125 ml. of water at 75° C. in a casserole, followed by the addition of 18.63 grams of 85 percent orthophosphoric acid and 4.03 grams of ammonium metavanadate. The batch was heated to about 90° C. and held, with stirring, for 10 minutes. The batch was then cooled to 40° C. and 37 ml. of ammonium hydroxide were added to obtain a pH of 8. A silica alumina carrier (100 grams) having a screen size of 3 to 5 mesh was added and the water in the batch was evaporated on a steam bath with stirring. The catalyst and carrier was then dried in a 110° C. oven, followed by calcining at 500° C. for 4 hours in a tube with air passing over the batch. After screening with a No. 6 mesh screen, 85.5 grams of supported catalyst were recovered which had a calculated composition (in the active metallic component) of 13.71 atomic percent vanadium, 64.35 atomic percent phosphorus and 21.94 atomic percent iron.

The resulting catalyst was charged (in a volume of 50 ml.) to a 1 inch I.D. fixed bed glass reactor tube and heated to about 500° C. A gaseous mixture, predominantly air, containing approximately 1.7 mole percent of n-butane was passed through the catalyst bed while maintaining a nominal space velocity of 1200 reciprocal hours. The maleic anhydride thus prepared was removed from the air stream by scrubbing the reactor effluent gases in water. In successive runs conducted under slightly varying operating conditions, the following results were obtained:

TABLE I

| Temp., ° C.: | n-Butane feed, mole percent of feed gas | Space velocity, hours$^{-1}$ | Yield, percent | Selec- tivity, percent |
|---|---|---|---|---|
| 495 | 1.583 | 1,200 | 19.3 | 80.5 |
| 500 | 1.744 | 1,211 | 18.6 | 76.5 |
| 505 | 1.740 | 1,211 | 17.9 | 68.9 |
| 515 | 1.755 | 1,211 | 17.6 | 72.4 |
| 515 | 1.759 | 1,211 | 15.5 | 78.1 |
| 515 | 1.755 | 1,211 | 15.2 | 89.2 |

Example 2

This example illustrates the preparation of maleic anhydride by the oxidation of n-butane using another catalyst wherein the catalytic component comprised phosphorus, vanadium, iron and oxygen.

The catalyst was prepared as follows:

4.32 grams of ammonium metavanadate were dissolved in 162 ml. of water with heating and stirring at 80° C. To the hot ammonium metavanadate solution were added 108 ml. of water, 23.89 grams of ferric nitrate, 20.0 grams of 85 percent orthophosphoric acid and 2.49 ml. of nitric acid. The batch was heated to 90° C. and held, with stirring, for about 10 minutes. The batch was then cooled below 60° C. and 23.14 ml. of ammonium hydroxide were added to obtain a pH of approximately 8. A silica alumina carrier (100 grams) having a screen size of 3 to 5 mesh was added and the batch was heated on a steam bath to 90° C. with stirring. The catalyst and carrier was then dried in a 110° C. oven for approximately 15 hours, followed by calcining at 500° C. for about 4 hours in a tube with air passing over the batch. After screening with a number 6 mesh screen, 80.9 grams of supported catalyst were recovered which had a calculated composition (in the catalytic component) of 13.71 atomic percent vanadium, 64.35 atomic percent phosphorus and 21.94 atomic percent iron.

The resulting catalyst was charged (in a volume of 50 ml.) to a 1 inch I.D. fixed bed glass reactor tube and heated to about 500° C. A gaseous mixture, predominantly air, containing approximately 1.6 mole percent of n-butane was passed through the catalyst bed while maintaining a nominal space velocity of 1200 reciprocal hours. The maleic anhydride thus prepared was removed from the gaseous mixture by scrubbing the reactor effluent gases in water. In successive runs conducted under slightly varying operating conditions, the following results were obtained.

TABLE II

| Temp., ° C.: | n-Butane feed, mole percent of feed gas | Space velocity, hours$^{-1}$ | Yield, percent | Selec- tivity, percent |
|---|---|---|---|---|
| 495 | 1.591 | 1,203 | 25.7 | 91.0 |
| 500 | 1.583 | 1,203 | 21.4 | 83.5 |
| 500 | 1.583 | 1,203 | 20.8 | 88.5 |
| 505 | 1.587 | 1,214 | 19.4 | 79.0 |
| 505 | 1.565 | 1,214 | 19.4 | 90.0 |
| 505 | 1.606 | 1,214 | 16.9 | 75.2 |

Example 3

This example illustrates the preparation of maleic anhydride by the oxidation of n-butane using still another phosphorus - vanadium - iron - oxygen catalyst. The catalyst was prepared as follows:

17.88 grams of 85 percent orthophosphoric acid were charged to a 1 liter flask fitted with a polytetrafluoroethylene stirrer, thermometer, and take-over condenser. After dilution to 100 cc. with distilled water, 23.63 grams of ferric nitrate were added dissolved in 50 cc. of water. 3.12 grams of ammonium metavanadate were then dissolved in 100 cc. distilled water by heating to 100° C. The dissolved salt was added to the contents of the flask while adding distilled water to a total of 300 cc. The system was then heated to 100° C. with stirring followed by cooling to room temperature. 21.1 cc. of concentrated ammonium hydroxide were added to the batch to achieve the desired pH of 8 to 10. The system was then heated with stirring to the boiling point (about 102° to 103° C.) and was concentrated by removing 200 cc. of water. The resulting yellow slurry was poured over 92.5 grams of alundum pellets in a 1 quart porcelain casserole. The casserole was then heated on a steam cone and agitated. The system was stirred with a glass rod at intervals of 5 minutes during the evaporative coating and as needed to keep the pellets from sticking in the final step. A small amount of distilled water was used to flush the surface of the casserole near the end of the coating cycle to insure maximum coating.

The coated pellets were left in the casserole with agitation for one hour on the steam cone to pack the coating. The coated pellets were then transferred to a glass tray which was placed in a muffle furnace at room temperature. This was heated to 450° C. over a period of one hour and held there for an additional hour. Air was passed over the pellets during the calcination. The resulting supported catalyst had a calculated composition (in the catalytic component) of 11.13 atomic percent vanadium, 64.56 atomic percent phosphorus and 24.31 atomic percent iron.

The catalyst was charged (in a volume of 189 ml.) to a 0.824 inch I.D. fixed bed steel reactor tube and air was passed through the catalyst while it was being heated to 470° C. The catalyst was maintained at this temperature while the passage of air was continued for an additional 4 hours. The air flow use was equivalent to approximately 1360 reciprocal hours space velocity.

Thereafter, the catalyst was heated to 480–500° C. and a gaseous stream, predominantly air, containing approximately 1.6 mole percent of n-butane was passed through the catalyst bed while maintaining a nominal space velocity of 1370 reciprocal hours. The maleic anhydride thus prepared was removed from the gaseous stream by scrubbing the reactor effluent gases in water. In successive runs conducted under slightly varying operating conditions, the following results were obtained.

TABLE III

| Temp., °C.: | n-Butane feed, mole percent of feed gas | Space velocity, hours | Yield, percent | Selectivity, percent |
|---|---|---|---|---|
| 470 | 1.584 | 1,362 | 18.3 | 95.0 |
| 480 | 1.599 | 1,362 | 22.1 | 92.5 |
| 490 | 1.605 | 1,366 | 25.0 | 89.2 |
| 500 | 1.614 | 1,366 | 29.2 | 88.5 |

In each of the foregoing examples, the yields are reported with respect to the amount of pure maleic anhydride produced. The temperatures quoted in the tables are reaction temperatures which are considered to be equivalent to catalyst temperatures.

An outstanding advantage of the process of the present invention is found in the remarkably high selectivities which are achieved, e.g., up to 95 percent. Thus, the phosphorus-vanadium-iron-oxygen catalyst allows a substantial amount of maleic anhydride to be produced from the amount of n-butane which is reacted.

A further illustration of the efficacy of the phosphorus-vanadium-iron-oxygen catalysts hereinbefore described is the essentially perfect material balance which can be demonstrated. Thus, when computing the percentage of n-butane which is converted to maleic anhydride, along with the percentage of feed gas which goes to carbon monoxide and carbon dioxide, it has consistently been found that no compounds remain unaccounted for in the process.

Still another indication of the superiority of the present process is the avoidance of tar formation in the reaction equipment and the essentially water white appearance of the maleic anhydride liquor.

While this invention has been described with reference to various specific examples and embodiments, it is understood that the invention is not limited thereto and that it can be variously practiced within the scope of the following claims.

The embodiments of the invention in which an exclusive property or privilege is claimed are defined as follows:

1. In a process for producing maleic anhydride by the catalytic vapor phase oxidation of a saturated aliphatic hydrocarbon having from 4 to 10 carbon atoms, the improvement which comprises conducting said oxidation in the presence of a catalyst comprising phosphorus, vanadium, iron and oxygen wherein the atomic ratio of phosphorus to vanadium is from about 1:1 to about 20:1 and the atomic ratio of iron to vanadium is from about 0.2:1 to about 10:1.

2. A method of Claim 1 wherein the atomic ratio of phosphorus to vanadium in the catalyst is from about 2:1 to about 8:1 and the atomic ratio of iron to vanadium is from about 1:1 to about 4:1.

3. A method of Claim 1 wherein the catalyst is at a temperature of from about 400° C. to about 600° C.

4. A method of Claim 1 wherein the hydrocarbon comprises from about 0.5 mole percent to about 10 mole percent of the oxidation mixture.

5. A method of Claim 1 wherein the hydrocarbon comprises from about 1 mole percent to about 4 mole percent of the oxidation mixture.

6. A method of Claim 1 wherein the hydrocarbon is n-butane.

References Cited
UNITED STATES PATENTS

| 3,293,268 | 12/1966 | Bergman | 260—346.8 |
| 3,156,706 | 11/1964 | Kerr | 260—346.8 |
| 2,773,921 | 12/1956 | Rylander et al. | 260—683.15 |

FOREIGN PATENTS

| 2,058,054 | 6/1971 | Germany. |

HENRY R. JILES, Primary Examiner

B. DENTZ, Assistant Examiner

U.S. Cl. X.R.

252—437